June 5, 1956  S. C. AKER  2,748,942
VIBRATORY SCREENING APPARATUS
Filed April 20, 1950  2 Sheets-Sheet 1
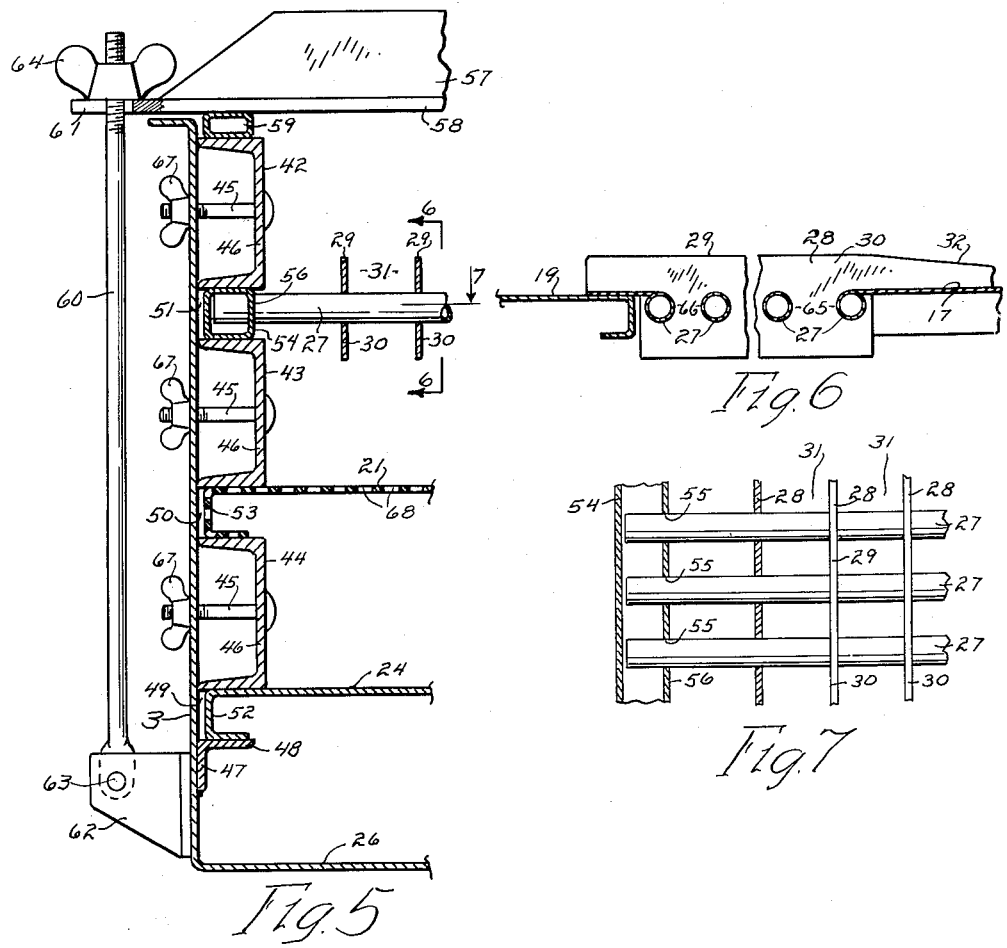
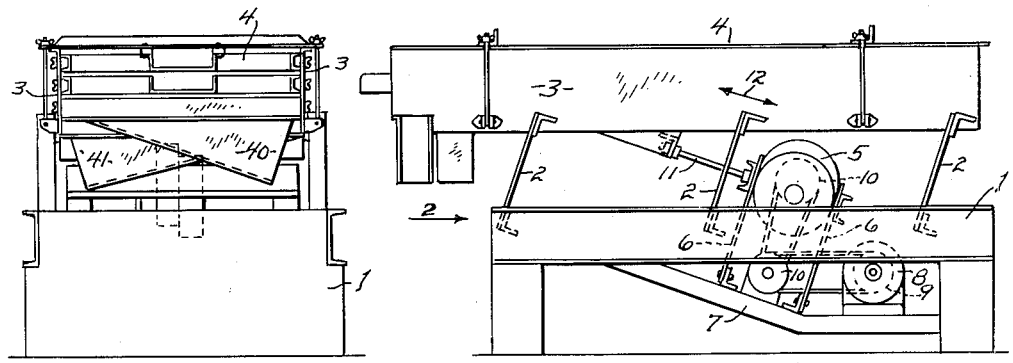
INVENTOR.
Sam C. Aker
BY Harry R. Canfield
ATTORNEY

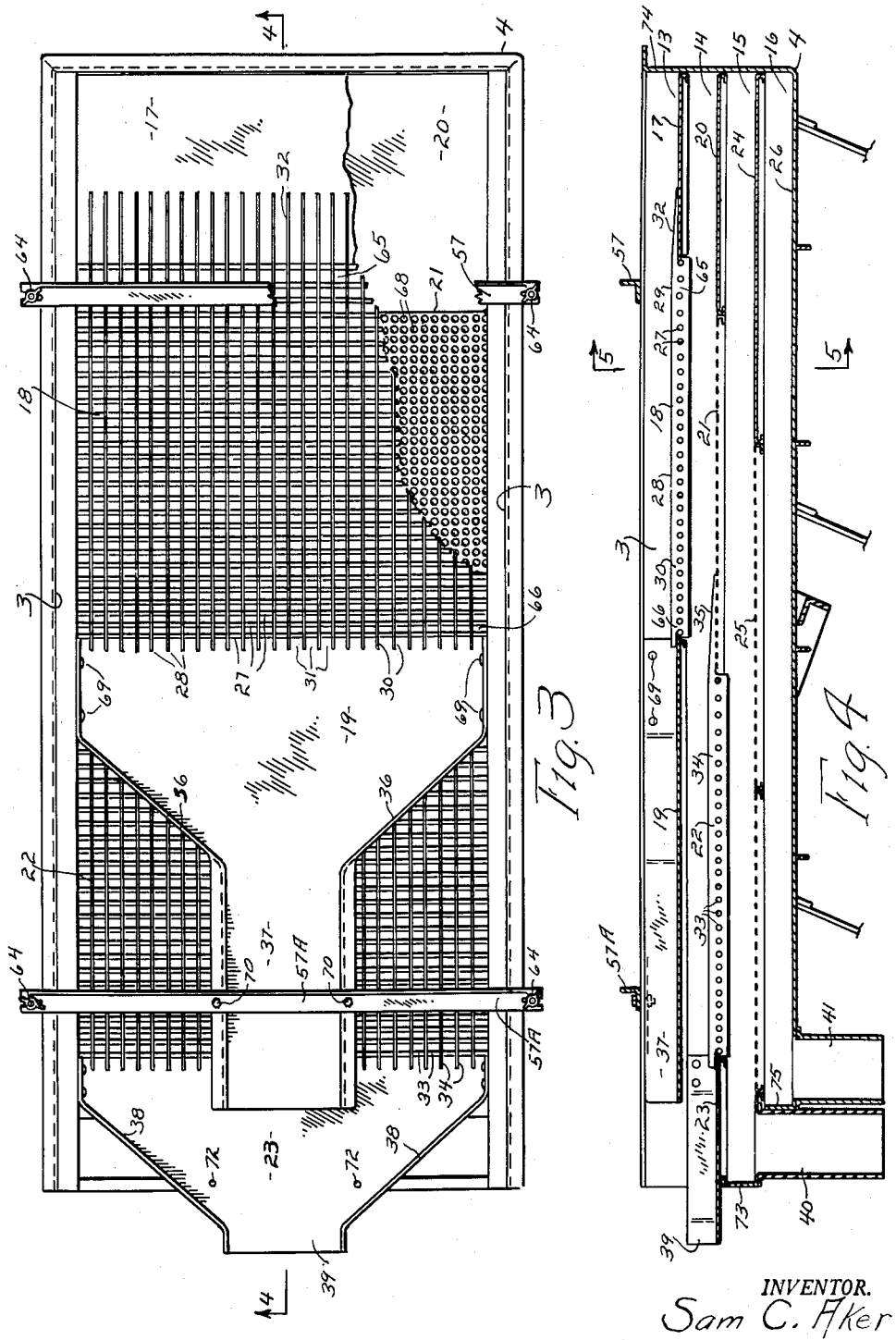

United States Patent Office 2,748,942
Patented June 5, 1956

2,748,942

VIBRATORY SCREENING APPARATUS

Sam C. Aker, Fort Worth, Tex.

Application April 20, 1950, Serial No. 157,102

4 Claims. (Cl. 209—315)

This invention relates to vibratory apparatus for screening and conveying discrete materials.

The invention is applicable to a variety of materials in various arts, but for the purposes of a concrete disclosure herein, I have chosen to illustrate and describe it as applied to the large scale production and processing of salable peanuts in their hulls.

Peanuts when they are harvested in the field, have pieces of the plant roots adhering to them. During handling, these root pieces, called "sticks," break off and become mixed with the peanuts. The sticks and peanuts also have soil adhering to them. The peanuts are unsalable until they have been separated from the sticks and the soil removed. The invention is an apparatus for performing this operation continuously on a quantity production scale.

In general, the apparatus comprises a vibrated "screen" or separator structure, in multiple stages, arranged in a tier, one stage above another, and all of the stages vibrated by a power driven vibratory device. The peanuts, sticks, and soil of dirt, enter the structure on the top stage at one end thereof, and are caused to be conveyed thereover by vibration; and while being conveyed, the peanuts, sticks, and dirt are separated and at the end of the conveyor are discharged separately into containers at the apparatus, or deposited on other conveyors for disposal remote from the apparatus.

The invention also comprises a novel separator construction for the short peanuts and relatively longer sticks, which construction aligns the sticks at right angles to the peanuts; so that the peanuts may drop through the separator acting as a screen, and the sticks may be conveyed in an orderly manner and without criss-crossing entanglement, and without dropping through the screen.

The actual invention is set forth in the claims.

Among the objects of the invention are:

To provide generally an improved vibratory separating, screening, and conveying apparatus;

To provide a separatory apparatus adapted in a novel manner to separate long bodies such as peanut sticks from short bodies such as peanuts;

To provide an improved vibratory apparatus for separating and screening discrete material, such as peanuts, peanut sticks, and dirt, and for conveying them after separation, to separate points of disposal.

With these objects in mind and others that will occur to those skilled in the art to which the invention appertains, an embodiment of the invention has been made which is fully disclosed in the following description taken in connection with the accompanying drawing, in which:

Fig. 1 is a side elevational view of an embodiment of the invention together with a power driven vibrating mechanism therefor;

Fig. 2 is an end elevational view of the apparatus of Fig. 1 taken in the direction of the arrow 2 of Fig. 1;

Fig. 3 is a top plan view of a vibratory screening and separating unit of Fig. 1 to enlarged scale;

Fig. 4 is a longitudinal sectional view from the plane 4—4 of Fig. 3;

Fig. 5 is a fragmentary cross-sectional view from the plane 5—5 of Fig. 4 to still further enlarged scale;

Fig. 6 is a fragmentary sectional view taken from the plane 6—6 of Fig. 5;

Fig. 7 is a fragmentary sectional view taken from the plane 7—7 of Fig. 5 with parts in plan.

Referring to Figs. 1 and 2 of the drawing, there is shown generally at 1 a main frame, to which are connected the lower ends of spring arms 2—2—2 extending upwardly rearwardly therefrom at an angle and connected at their upper ends to the side walls 3—3 of a separating, screening, and conveying unit 4 to be more fully described.

At 5 is a rotary vibrator of a well known type, and therefore not shown in detail, supported by resilient arms 6—6 upon a frame element 7 and rotatably driven by a motor 8 through a transmission comprising belts 9—9 and pulleys 10—10. The frame of the vibrator 5 is connected to the unit 4 by a rod 11 which, upon rotation of the vibrator 5, transmits vibration to the unit 4; and, because of the inclination of the arms 2—2, the vibration causes the entire unit 4 to have vibratory movement in the direction of the arrow 12.

The parts thus far referred to except as to the construction of the unit 4 to be more fully described, constitute no essential part of the invention and are well known, and may be variously constructed.

Coming now to the unit 4, and with reference to Figs. 3 and 4, it comprises between the side walls 3—3 four stages or decks 13—14—15—16, supported on the side walls by a construction to be described.

The decks are in a tier as shown, all preferably horizontal and parallel, and spaced apart vertically.

The deck 13 comprises (proceeding from right to left) a solid sheet metal floor or floor portion 17; a separator 18; and a solid sheet metal floor or floor portion 19.

The deck 14 comprises a solid floor or floor portion 20; a screen floor or floor portion 21 of perforated sheet metal; a separator 22; and a solid sheet metal floor or floor portion 23.

The deck 15 comprises a solid sheet metal floor or floor portion 24; and a screen floor or floor portion 25 of perforated sheet metal.

The deck 16 comprises a solid sheet metal floor 26.

The separator 18 comprises a layer or series of longitudinally spaced tubes 27—27 extending transversely of the unit and parallel and supported at their ends on the side walls 3—3. The spacing of the tubes will be referred to again, but in general is greater than the width of the peanuts so they can fall through between tubes as will be described.

Dividers in the form of sheet metal walls 28 extend longitudinally of the unit and transversely spaced apart and parallel and with their upper edges 29 above the tubes, and preferably comprise flat sheet metal strips 30 having perforations therein through which the tubes 27 extend, whereby the strips 30 are supported by the tubes 27. The spacing of the strips is a little greater than the length of the peanuts so that they can descend onto the tubes.

The top surfaces of the tubes 27—27 are preferably about on a level with the floors 17 and 19 as indicated in Fig. 4; and shown better in Fig. 6; and the walls 28 provided by the strips 30 extend above the floors 17—19.

In effect therefore the strips 30 provide longitudinal parallel troughs 31 (Fig. 5), the bottoms of the troughs comprising longitudinally spaced tubes, on a level with the floors 17—19.

At their right hand ends, the upper edges 29 of the strips 30 incline downwardly to and merge with the floor 17 as shown at 32, Figs. 4 and 6.

The separator 22 has the same construction as the separator 18 and need not be additionally described except to identify its tubes as 33, its strips as 34, and their inclined edges as 35.

Further description of the decks will be given as needed in connection with the description of their operation which follows.

First deck

The peanuts as harvested, consisting of a mixture of peanuts, sticks, and dirt, as referred to, are poured from a receptacle or from a conveyor, not shown, upon the solid floor 17 of the first deck 13.

The sticks are several times as long as the peanuts.

Vibration of the deck effected as described for Figs. 1 and 2, agitates the mixture and also propels or conveys it toward the left.

The inclined edges 32 of the strips 30 in effect plow under and upward through the moving mixture, and lift any sticks that happen to lie cross-wise of the strips; so that they do not pile up at the ends of the strips and jam the flow.

Peanuts at the bottom of the mixture and also sticks that are aligned with the strips move into the aforesaid troughs between the strips, and the sticks longitudinally overlap several tubes and are conveyed forwardly, and the peanuts sink to the bottom onto the tubes and the vibration aligns them with the tubes and they fall through between them.

Sticks that are not aligned with the strips are conveyed forwardly, at first on the top edges 29 of the strips, and the vibration causes them to become aligned with the strips and to descend into the troughs and be conveyed forwardly. Peanuts higher up in the mixture, agitated by the vibration, work down into the troughs and fall through.

In this manner, most of the sticks are conveyed forwardly onto the solid floor 19 and discharged by gravity onto the solid floor 23 of the second deck 14; some of the sticks may fall through to the second deck 14; all of the peanuts and dirt fall through to the second deck 14.

Second deck

The peanuts, sticks, and dirt falling through the separator 18 to the second deck 14 are vibrated and conveyed toward the left thereon. Some of the dirt is shaken loose and falls through the screen 21 onto the third deck 15. Sticks and peanuts and the rest of the dirt, if any, are propelled over the separator 22 and, as has been described for separator 18, the separator 22 separates out the rest of the sticks and propells them on to the solid floor 23 where they join with sticks from the floor 19 and discharge, as will be described.

The peanuts and the rest of the dirt broken loose by vibration fall through separator 22 to the third deck 15.

Third deck

All of the dirt and all of the peanuts which have thus fallen through to the third deck 15 are vibrated thereon and conveyed thereover, the dirt falling through the perforated floor 25 to the fourth deck 16, and the peanuts flowing over the perforated floor 25 and discharging from its end, as will be described.

Fourth deck

The fourth deck 16 having a solid floor 26, conveys the dirt thereon toward the left where it discharges.

Discharge

The discharge ends of the several decks may be variously constructed. In the embodiment illustrated, the solid floor 19 of the first deck is provided with converging side walls 36—36 converging into a trough 37, above the floor 23; the side walls 36—36 being secured directly to the unit side walls 3—3 by bolts or rivets 69—69 and the trough 37 being connected to an overlying clamp bridge 57A by bolts or rivets 70—70.

The floor 23 has side walls 38 converging into a spout 39; and the sticks therefore discharge from the spout 39; and the side walls 38 may be secured to the unit walls 3—3 by volts or rivets 71, and the floor 23 secured by bolts or rivets 72 to a transverse end wall element 73.

As shown, the beginning end of the unit 4 has an end wall 74 whereas the finishing end is open except for the transverse wall element 73 at the end of deck 15 and a like element 75 at the end of deck 16.

The third deck 15 may have a discharge spout 40 at its end extending transversely and inclined as shown in Fig. 2, for discharging the peanuts at one side; and the fourth deck may have a similar discharge spout 41 inclined in the other direction to discharge the dirt at the other side.

Each of the spouts 39, 40, and 41 may discharge into receptacles, or upon conveyors not shown.

A description of the preferred construction of the decks and discharge outlets above mentioned follows.

While the ends of the tubes 27 and the side edges of the decks generally, may be mounted on or attached to the unit side walls 3—3 in any well known or suitable manner, within the scope of the invention, I prefer a construction such as is shown in Figs. 5 and 7, which permits ready removal and replacement of the decks; for example if it be desired to change the spacing of the tubes 27 to adapt the separators 18 and 22 to different commercial varieties and corresponding sizes of peanuts.

Fig. 5 is taken at the section plane 5—5 of Fig. 4, and it is believed that a description of the structure at that point will suffice for other points along the unit.

Three channels 42—43—44 are mounted on each of the side walls 3—3 (that on only one wall 3 being shown) by volts 45—45 projected through holes in the channel webs 46 and aligned holes in the side wall 3. The holes in either the webs 46 or the wall 3 may be over-size with respect to the bolts 45 to allow for shifting of the channels. Wing nuts 67—67 are provided on the bolts 45 outwardly of the wall 3 and initially left slightly loose and later drawn up tight to rigidly mount the channels 42—43—44 after the structure has been clamped together vertically as will presently be described, during which clamping action the channels may shift as referred to.

A foundation angle 47 is permanently rigidly secured to the side wall 3 with a flange 48 thereof horizontal.

It will be understood that the channels 42—43—44 and angle 47 extend longitudinally along both side walls 3—3.

Longitudinal grooves 49—50—51 are provided along the side wall 3 by spacing the channel 44 from the angle 47, and by spacing the channels 42—43—44 from each other.

The lowermost deck 16 has its solid floor 26 integrally joined or formed integrally with the walls 3—3.

The floor 24 of the deck 15 has its peripheral edge turned or rolled to provide an inwardly concave channel 52 substantially fitting the groove 49; and similarly the floor 21 of deck 14 has a peripheral channel 53 in the groove 50.

A tube 54 of square cross section is disposed in the groove 51. This tube 54 may be as shown of drawn metal in tubular form, but if preferred it may be built up or composed of parts by well known methods. The ends of the separator tubes 27—27 project through perforations 55—55 in a side wall 56 thereof (Figs. 5 and 7).

By loosening the bolts 45—45 and exerting a clamping action to push downwardly on the topmost channel 42, the square separator tube 54, floor channels 53 and 52 and the channels 42—43—44 may all be clamped into a rigid structure or tier supported on the angle flange 48 at the bottom; facilitated by drawing the bolts 45 tight by the wing nuts 67.

To provide the clamping force, an overhead bridge 57, which may conveniently be made from a piece of angle section steel, transversely bridges the top of the unit, with a flange 58 thereof disposed horizontally.

A filler 59 is preferably placed between the flange 58 and the top of the top channel 42. A vertical bolt 60 extends through a slot 61 in the flange 58, outwardly laterally of the side wall 3, and at its lower end is secured to a bracket 62 secured to the side wall 3, preferably by a hinge pivot bolt or rivet 63.

A wing nut 64 on the upper end of the bolt above the bridge flange 58 when turned draws the bridge 57 downwardly exerting the said clamping action through the filler 59.

As will be understood, a similar construction is provided at the opposite side wall 3 of the unit, and the other end of the bridge 57 is similarly clamped downwardly thereon.

Another and similar bridge 57A (shown in Fig. 3) is provided spaced from the bridge 57 and at a point above an assembly of channels like 42—43—44 etc. described, to mount similarly constructed side edges of the floor portion 19, the separator 22, and floor portions 25 and 26 as will be apparent.

The bridges may be removed at any time by loosening the wing nuts 64, and hinging the bolts 60 outwardly; and the decks will be freed to be removed as referred to and as will now be clear.

The said strips 30—30 are mounted by being supported on the tubes 27—27, the latter being projected through perforations in the strips, and the strips may be suitably spaced along the tubes; the spacing shown having been found suitable when the drawing, Figs. 5, 6, and 7, is considered as being to three-eighths of full scale.

As will be apparent, the separator 18 (and similarly the separator 22) may be made separately as a complete assembly, comprising the square tubes 54, the round tubes 27 and strips 30 and laid in place in the unit as described.

While the tubes 27—27 may be spaced apart uniformly throughout the separator, it has been found in practice more satisfactory to space them farther apart at the beginning end as at 65, Fig. 3, than at the finish end as at 66; this variation of spacing will be clearly apparent in Fig. 3 and Fig. 6.

As an example of tubes and spacing, tubes ⅝ inch diameter have been found to be satisfactory, and spaced with center to center distances varying gradually from 1½ inches to 1⅛ inches.

By spacing the tubes farther apart at the beginning, where there is a mixture of "sticks" and peanuts, the peanuts and sticks promptly become stratified and the peanuts go to the bottom keeping the sticks from falling through; and letting the peanuts fall at once through the wider openings; and at the finish end, all of the peanuts have already fallen through and only sticks remain, and they are less liable to rise up endwise and fall through if the tubes are closer together.

As to the perforated floor portions 21 and 25, these may be made from eighteen gauge or twenty gauge sheet metal with stamped out round holes 68, ⅛ inch diameter, at standard spacing as sold commercially by metal distributors.

With reference to Fig. 1, and as stated, the entire unit 4 will be vibrated longitudinally but in the angular directions of the arrow 12 and as is well known, such vibrations will cause the material to be screened or separated, and at the same time conveyed along the unit from the right hand or beginning end to the left hand or finishing end in a well known manner, and it is deemed not necessary to illustrate or describe it.

As shown in Fig. 6 and indicated in Fig. 4 in connection with the separator 18, the tubes 27—27 are supported in the square tubes 54 so that the deck floor portions 17 and 19 will be about tangent to the upper sides of the tubes 27.

While as stated above, perhaps the most important use for the screening and separating unit above described is to separate peanuts from the "sticks" and to remove dirt from the peanuts, the unit may be applied to other uses, of which the following may be mentioned.

In the harvesting of grain such as oats, wheat, etc. and cotton seed, even if threshing machinery is employed, there are sometimes accumulations of a mixture of grains and seeds with straw or parts of the cotton plants, etc. with the seeds, and by the above described unit, the seeds or grains may be separated in a manner corresponding to that of separating the peanuts and discharging them from the unit separately from the sticks, straw, etc.

In some cases, the entire deck 16 and discharge spout 41 may be omitted and the dirt falling through the screen 25 may be allowed to fall on the ground and accumulate in a readily removable pile.

The general principle of screening and separating embodied in the above description of the apparatus may be embodied in structures having different or modified elements of construction from those above described, and the invention is comprehensive of all such changes and modifications which come within the scope of the appended claims.

I claim:

1. A screening and separating unit for separating short and long discrete materials in apparatus through which such materials are conveyed, said unit comprising: an elongated main frame supported for vibratory movement; an upper deck supported on the frame for vibratory movement therewith comprising in longitudinal series a material receiving floor portion, and a separator portion; the separator portion comprising longitudinally spaced parallel transverse elements having upwardly convex rounded surfaces, the transverse elements being spaced in the direction materials are conveyed through the apparatus and being disposed generally transverse to such direction; longitudinal walls supported by the transverse elements, said walls extending in the general direction of conveyance and being transversely spaced and terminating upwardly at upper longitudinal edges above the transverse elements; the floor portion being substantially at the level of the upper surfaces of the transverse elements and the upper edges of the walls at one end continuing over the floor portion and inclined downwardly to the floor portion.

2. A screening and separating unit for separating short and long discrete materials, comprising: a vibratory main frame and decks supported on the frame to vibrate therewith; an uppermost deck comprising in series a first imperforate floor portion and a first separator and a second imperforate floor portion having a discharge outlet therefrom; a second deck under the uppermost deck comprising in series a first screen portion, a second separator portion and a third imperforate floor portion having a discharge outlet therefrom; the screen portion being generally under the first separator portion; a third deck under the second deck comprising a screen under both separator portions; the separator portions being substantially alike and comprising each transversely elongated rectangular oblong openings therethrough provided by a plurality of transverse, longitudinally spaced parallel elements having upwardly convex rounded surfaces, and transversely spaced longitudinal walls, supported by the transverse elements and terminating upwardly in longitudinal edges above the rounded surfaces; the first floor portion of the first deck being substantially at the level of the rounded surfaces of the first separator; and the first screen of the second deck being substantially at the level of the rounded surfaces of the second separator; the upper terminal edges of the walls extending over the first floor portion and first screen respectively and inclined downwardly thereto.

3. A vibratory conveyor for conveying and separating material composed of short pieces, long pieces and fine pieces, comprising: a vibratory frame; a tier of vertically spaced longitudinally elongated conveying decks supported on the frame; a first deck comprising a separator having transversely elongated oblong openings to allow the short pieces and fine pieces to fall through to a second deck and having transversely extending aligning means to align the short pieces lengthwise of the openings; and the first deck having longitudinally extending aligning means to align long pieces longitudinally of the deck and crosswise of the openings to be conveyed forwardly over the deck to a discharge outlet; the said second deck comprising a screen to allow fine pieces to fall through to a third deck and comprising a second similar separator to similarly align short pieces and to allow short pieces and fine pieces to fall through the second deck to a third deck and to similarly align and convey long pieces to a discharge outlet; a third deck having openings allowing fine pieces to fall through and for conveying short pieces to a discharge outlet.

4. A separator for use in combination with vibratory screening apparatus of the type in which mixtures of sticks and peanuts or similar relatively long and short materials to be separated are introduced at one end of the apparatus and are separated while being conveyed by vibration toward the other end of the apparatus, said separator comprising spaced generally parallel elongated side members adapted to be secured in the apparatus to extend generally horizontally and in the general direction in which the materials are conveyed, a plurality of substantially parallel cross members supported at their ends by the side members and extending transversely to said conveyance direction, said cross members having convexly curved upper surfaces for supporting long materials being conveyed, and a plurality of horizontally spaced elongated flat dividers of thin section relative to the cross members carried by the latter, said dividers being disposed in vertical planes generally paralleling one another and extending longitudinally in the conveyance direction and having top edges above the convex surfaces of the cross members, the ends of the dividers being tapered in height and substantially free to plow into oncoming material being conveyed to cause long material to ride onto the top edges of the dividers, and the spaces between the dividers being greater than the long dimension of the short material of the mixture whereby such short material is receivable between adjoining dividers with its long axis transverse to the conveyance direction.

References Cited in the file of this patent

UNITED STATES PATENTS

| | | |
|---|---|---|
| 305,299 | Edwards | Sept. 16, 1884 |
| 446,687 | Landis | Feb. 17, 1891 |
| 566,793 | Parsons | Sept. 1, 1896 |
| 1,051,157 | Owens | Jan. 21, 1913 |
| 1,713,143 | Overstrom | May 14, 1929 |
| 2,114,406 | Simpson | Apr. 19, 1938 |
| 2,156,716 | Beckwith | May 2, 1939 |
| 2,363,348 | Maurice | Nov. 21, 1944 |
| 2,399,280 | McDonell | Apr. 30, 1946 |
| 2,440,197 | Good | Apr. 20, 1948 |
| 2,548,142 | Carter | Apr. 10, 1951 |

FOREIGN PATENTS

| | | |
|---|---|---|
| 357,545 | Germany | Aug. 26, 1922 |